United States Patent [19]
Polyak

[11] Patent Number: 5,207,510
[45] Date of Patent: May 4, 1993

[54] LINEAR BALL BEARING ASSEMBLY

[76] Inventor: Alexander Polyak, 320 Auburn Way #3, San Jose, Calif. 95129

[21] Appl. No.: 750,954

[22] Filed: Aug. 28, 1991

[51] Int. Cl.$^5$ ............................................. F16C 29/06
[52] U.S. Cl. ................................................. 384/43
[58] Field of Search ........................... 384/43, 44, 45; 464/168

[56] References Cited

U.S. PATENT DOCUMENTS

| | | | |
|---|---|---|---|
| Re. 25,489 | 11/1963 | Anderson | 464/168 |
| 2,559,292 | 7/1951 | Ferger. | |
| 2,628,135 | 2/1953 | Magee. | |
| 3,788,708 | 1/1974 | McCloskey. | |
| 3,884,537 | 5/1975 | McCloskey. | |
| 3,975,064 | 8/1976 | Nilsson. | |
| 4,444,443 | 4/1984 | Teramachi | 384/43 |
| 4,932,793 | 6/1990 | Milanov et al. | 384/43 |

Primary Examiner—Lenard A. Footland

[57] ABSTRACT

An antifriction linear ball bearing assembly comprises a trihedral cassette (10) with flats (24, 26, and 28), and a central opening for rigidly holding a cylindrical shaft. The cassette (10) has flats which each contain a closed raceway circuit (36) having an elliptical shape. The raceway circuit is filled with bearing balls (14), kept within their track by a ball retainer (12). When the bearing assembly and the shaft, mounted into it, are translated inside an outer sleeve, the bearing balls (14) circulate within the raceway circuits, thus allowing smooth longitudinal movement of the shaft and ensuring uniform wear of the contact surfaces. The linear ball bearing assembly can be applied to mechanisms, such as a motion transmitting device or a feedthrough apparatus, where a shaft supported by antifriction bearings must longitudinally translate inside a hollow outer housing.

9 Claims, 1 Drawing Sheet

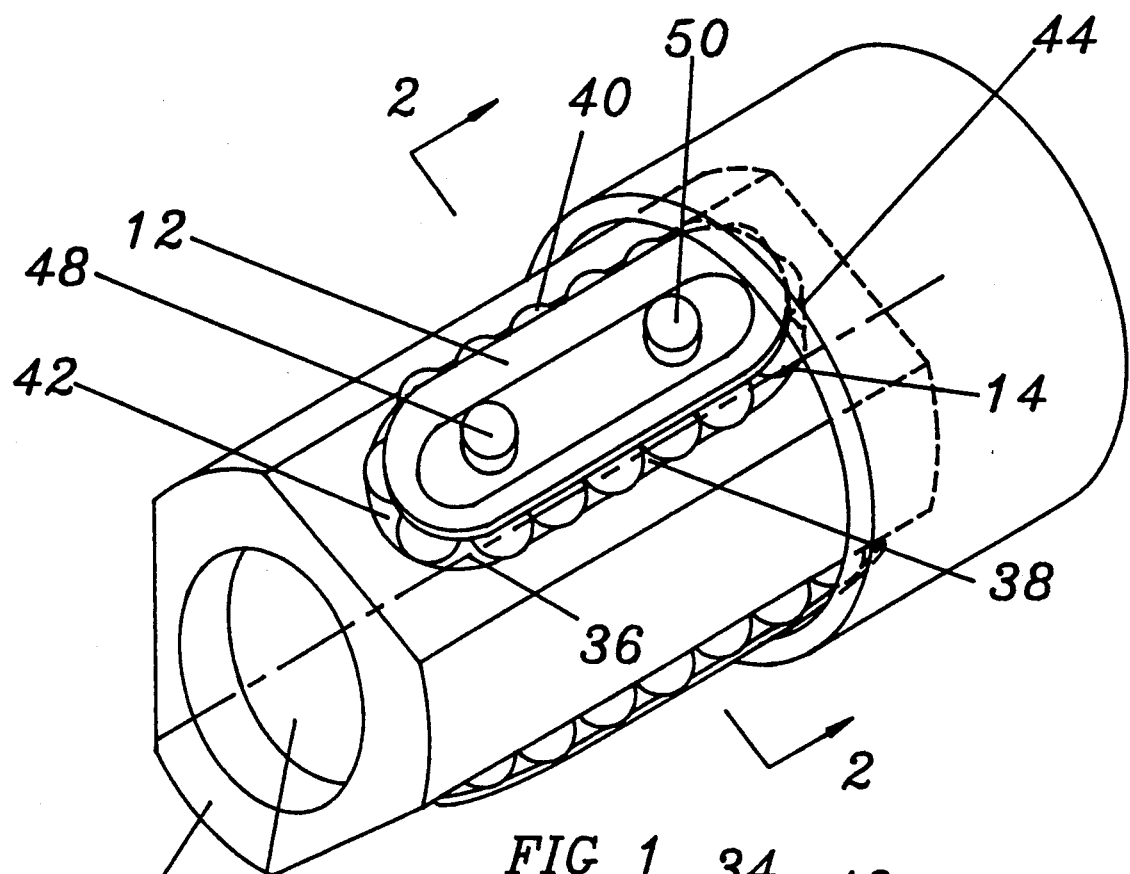
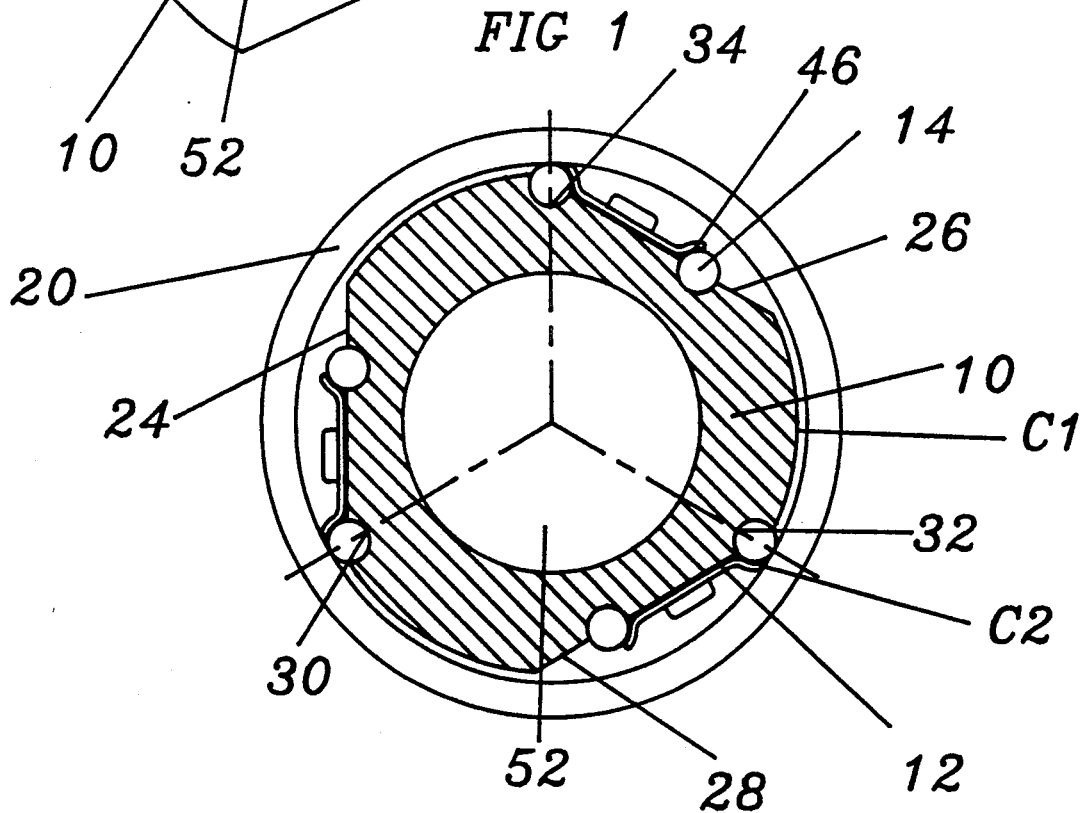

LINEAR BALL BEARING ASSEMBLY

BACKGROUND

1. Field of Invention

The present invention relates to a ball bearing assembly, particularly to an antifriction linear ball bearing assembly for longitudinally moving a shaft without friction within an outer sleeve.

2. Description of Prior Art

A great Variety of devices exist for enabling a shaft to move longitudinally within a sleeve. These devices generally comprise linear ball bearing assemblies. One such assembly, which is described in U.S. Pat. No. 3,884,537 to McClosky, 1975, is adopted for mounting on a circular shaft and comprises an outer sleeve and a concentric inner sleeve. The inner sleeve has a number of tracks that define paths for the circulation of balls between the sleeve and the shaft during movement of the sleeve along the shaft. The shaft has a plurality of longitudinally extending shallow raceways which form bearing surfaces for the balls as they encounter the shaft and the raceways. The vertical depth of the raceway is only a fraction of the diameter of the balls. However, this bearing assembly is designed to ride on the shaft and is not suitable for moving a shaft together with its bearing support longitudinally within a stationary outer sleeve. Moreover, the assembly is expensive to manufacture since all of its parts require intricate machining.

Another linear ball bearing assembly, described in U.S. Pat. No. 2,559,292 to Ferger, 1945, consists of a shaft and an outer sleeve. Separate continuous grooves with two straight and two curved portions are machined in the periphery of the shaft, forming four raceway circuits substantially filled with bearing balls. One straight portion of each groove is shallower than the remaining portion of the groove. In another embodiment Ferger shows an assembly where the interior face of the sleeve, rather than the periphery of the shaft, contains the raceway circuits. The curved end portions of the grooves are cut, molded, or cast in separate pieces, which are then press-fitted into the ends of the sleeve. One drawback of the aforementioned bearing assembly is high manufacturing cost, since curved passages and passages with uneven depths have to be machined.

OBJECTS AND ADVANTAGES

It is therefore an object of the invention to eliminate the above disadvantages. Another object is to provide a ball bearing assembly of the linear type in which a bearing assembly attached to a circular shaft can move longitudinally along with the shaft inside an outer sleeve and where the design of the assembly makes it unnecessary to machine the periphery of the shaft or the interior face of the sleeve.

A further object of the invention is to provide an efficient ball bearing assembly which is simple in design and is inexpensive to manufacture.

Other advantages and features of the invention will become apparent from a consideration of the ensuing description and drawings.

DRAWING FIGURES

FIG. 1 is a perspective view of the linear ball bearing assembly of the invention.

FIG. 2 is a sectional view taken in the direction indicated by lines 2—2 of FIG. 1.

REFERENCE NUMERALS USED IN THE DRAWINGS AND DESCRIPTION

10—cassette
12—ball retainer
14—bearing balls
20—outer sleeve
24, 26, 28—flats
30, 32, 34—apices of the flats
36—raceway circuit
38, 40—straight portions of the raceway circuit
42, 44—curved portions of the raceway circuit
46—flange
48, 50—bolts
52—opening
C1, C2—clearances

DESCRIPTION—FIGS. 1 AND 2

A linear ball bearing assembly of the invention, shown in FIG. 1, includes a cylindrical body with flats, namely a monolithic, trihedral prismatic cassette 10 that is slidingly mounted inside a cylindrical outer sleeve 20 with a clearance C1 (FIG. 2). Cassette 10 comprises longitudinal flats 24, 26, and 28 spaced circumferentially around the periphery of the cassette, with apices 30, 32, and 34 of the flats positioned 120° apart. Each flat contains a continuous raceway circuit 36 (FIG. 1) of uniform depth, comprising straight longitudinal portions 38 and 40, one of which, i.e. 40, is a working portion. Curved end portions 42 and 44 connect straight portions 38 and 49. Portions 38, 42, and 44 thus serve as returning portions. Each raceway is positioned adjacent one edge of its flat so that the working portion of each raceway lies at an apex of its flat, e.g., portion 40 (FIG. 1) lies at apex 34.

A retainer 12, contoured to fit over raceway circuit 36, loosely holds bearing balls 14, which substantially fill the raceway circuit. Balls 14 are held loosely enough to allow their unrestricted rolling movement within the raceway circuit. Retainer 12 consists of a flat plate, shaped to fit over raceway circuit 36, and a peripheral flange 46, bent upward to accommodate balls 14. A clearance C2 is formed between outer sleeve 20 and the side of flange 46 that covers working portion 40 of raceway circuit 36. Bolts 48 and 50 secure retainer 12 to the flat portion of cassette 10. When a shaft (not shown) is rigidly fixed, i.e. by press fit, into an opening 52 centrally located within cassette 10, cassette 10, along with the supported shaft, constitutes a linear ball bearing assembly that can longitudinally translate inside hollow outer sleeve 20.

When cassette 10 is inserted into sleeve 20 as shown, balls 14, located in the working portions of the raceways, contact the inner surface of sleeve 20.

In one particular application where the linear ball bearing assembly of the invention is used for moving a shaft in a feedthrough mechanism for a vacuum chamber, cassette 10 is 3 cm long with an outside diameter of 3.5 cm. The diameter of centrally located hole 52 is 18 mm and width of each of flats 24, 26, and 28 is 15 mm.

OPERATION

As the shaft (not shown) rigidly connected to cassette 10 is axially translated in one direction within outer sleeve 20, bearing balls 14, trapped inside working portions of raceway circuits, e.g., portion 40 of raceway circuit 36, are acted upon by rolling forces from raceway circuit 36 and outer sleeve 20. As a result, balls 14 in portion 40 will undergo a continuous rolling motion in the reverse direction of the shaft motion, allowing frictionless axial translation of the shaft inside outer sleeve 20. The continuous rolling motion of balls 14 is ensured by the orientation and shape of the raceway circuit. The orientation of the raceway circuits, e.g., raceway circuit 36, is such that only bearing balls 14 in working portion 40 of the circuit contact sleeve 20. Thus only those of balls 14 in working portions of the raceway circuits are subjected to opposing rolling forces. As a result, all bearing balls within each raceway circuit move unidirectionally in a continuous path. Returning portions, e.g., portions 38, 42, and 44 of raceway circuit 36, serve as means for continuous motion of the balls within their track. Therefore, during axial motion of the ball bearing assembly attached to the shaft, balls 14 circulate in their closed raceways, thus ensuring uniform wear of the contact surfaces.

When the shaft is moved in the reverse axial direction, the balls in the working portions of raceway circuits will experience opposite rolling forces, causing them to circulate backwards in their raceway circuits.

The construction of the raceways is such that balls 14 will circulate in their raceways only when the shaft is linearly translated within outer sleeve 20. The balls can not roll in the raceways if the shaft is rotated. Therefore, the linear ball bearing assembly will allow the shaft to execute frictionless translational motion, but not rotation.

Retainer 12 and flats 24, 26, and 28, placed at outer surface of cassette 10, eliminate the need to machine the periphery of the shaft or the interior face of the sleeve. Thus the raceway circuits can have uniform depth on all their portions.

SUMMARY, RAMIFICATIONS, AND SCOPE

Thus, it has been shown that bearing assembly of the invention enables frictionless longitudinal movement of a shaft (not shown) within outer sleeve 20.

Although the linear ball bearing assembly has been shown and described in the form of one specific embodiment, its parts, materials, and configurations have been given only as examples, and many other modifications of the linear ball bearing assembly are possible. For example, the trihedral cassette depicted in FIGS. 1 and 2 represents only one embodiment of the invention, but it could also be a quadrahedral, pentahedral, or hexahedral prismatic cassette. Moreover, the shape of the raceway may vary, the only constraint being that the raceway form a continuous track. Furthermore, cassette 10 can be made integrally with the shaft and may in fact comprise a solid shaft. Retainer 12 can be eliminated by using raceway circuits which are deeper than the radii of balls 14, with shoulders of the circuit preventing the balls from coming out of their grooves.

Therefore, the scope of the invention should be determined not by the example given, but by the appended claims and their legal equivalents.

What I claim is:

1. A linear ball bearing assembly for longitudinal movement inside a hollow housing, comprising:
   (a) a cylindrical body having a plurality of longitudinal flat portions formed on the peripheral surface thereof on at least a portion of its length;
   (b) at least one closed raceway formed on each of said flat portions, said raceway having a working portion and a returning portion, said working portion being straight and said returning portion consisting of a straight portion and a pair of adjoining curved portions;
   (c) a plurality of balls for providing said cylindrical body with frictionless linear motion within said hollow housing, said balls substantially filling said closed raceways; and
   (d) retaining means for holding said balls within said closed raceways, said retaining means comprising, for each raceway, a flat plate with an upwardly bent peripheral edge, said plate in a plan view having a configuration corresponding to the shape of said closed raceway, a portion of said edge, which is located over said working portion, and said hollow housing having a clearance therebetween, said prismatic body and said hollow housing having a clearance therebetween.

2. The linear ball bearing assembly of claim 1 wherein said plurality is three, and said flat portions are uniformly spaced in an angular direction.

3. The linear ball bearing assembly of claim 2 wherein said retaining means for each raceway has means for rigidly attaching said retaining means to its corresponding flat portion.

4. The linear ball bearing assembly of claim 3 wherein said attaching means comprises at least one fastener.

5. A linear ball bearing assembly for longitudinal movement inside a hollow housing, comprising:
   (a) a shaft having three longitudinal flat portions formed on the peripheral surface thereof on at least a portion of its length, said flat portions being uniformly spaced in an angular direction;
   (b) at least one closed raceway formed on each of said flat portions, said raceway having a working portion and a returning portion, said working portion being straight and said returning portion consisting of a straight portion and a pair of adjoining curved portions;
   (c) a plurality of balls for providing said shaft with frictionless linear motion within said hollow housing, said balls substantially filling said closed raceways; and
   (d) retaining means for holding said balls within said closed raceways, said retaining means comprising for each raceway a flat plate with an upwardly bent peripheral edge, said plate in a plan view having a configuration corresponding to the shape of said closed raceway, a portion of said edge, which is located over said working portion, and said hollow housing having a clearance therebetween, said shaft and said hollow housing having a clearance therebetween.

6. The linear ball bearing assembly of claim 5 wherein said shaft has a central opening.

7. The linear ball bearing assembly of claim 5 wherein said shaft has a peripheral shape selected from the group consisting of quadrahedral, pentahedral, and hexahedral prisms.

8. The linear ball bearing assembly of claim 7 wherein said retaining means for each raceway have means for rigidly attaching said retaining means to its corresponding flat portion.

9. The linear ball bearing assembly of claim 8 wherein said attaching means comprises at least one fastener.

* * * * *

UNITED STATES PATENT AND TRADEMARK OFFICE
CERTIFICATE OF CORRECTION

PATENT NO. : 5,207,510
DATED : May 4, 1993
INVENTOR(S) : Alexander Polyak

It is certified that error appears in the above-indentified patent and that said Letters Patent is hereby corrected as shown below:

On the title page, after item [76] Inventor insert the following:
   --[73] Assignee:  Huntington Mechanical Laboratories, Inc.,
                     Mountain View, CA--.
On the title page, after "Primary Examiner...." insert
--Attorney, Agent, or Firm—David Pressman--.

Signed and Sealed this

Eleventh Day of January, 1994

Attest:

BRUCE LEHMAN

Attesting Officer      Commissioner of Patents and Trademarks